United States Patent
Woodhouse et al.

(10) Patent No.: US 10,336,186 B2
(45) Date of Patent: Jul. 2, 2019

(54) PUSHBUTTON VEHICLE SHIFTER INTERFACE

(71) Applicant: Ford Global Technologies, LLC, Dearborn, MI (US)

(72) Inventors: David Woodhouse, Troy, MI (US); Soo Young Kang-Morales, Northville, MI (US); Ryan G. Niemiec, Northville, MI (US); Ryan Blodi, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/441,710

(22) Filed: Feb. 24, 2017

(65) Prior Publication Data

US 2017/0274765 A1    Sep. 28, 2017

Related U.S. Application Data

(60) Provisional application No. 62/312,135, filed on Mar. 23, 2016.

(51) Int. Cl.
| | |
|---|---|
| *B60K 20/08* | (2006.01) |
| *B60K 37/06* | (2006.01) |
| *F16H 59/12* | (2006.01) |
| *F16H 59/02* | (2006.01) |

(52) U.S. Cl.
CPC ............. *B60K 20/08* (2013.01); *B60K 37/06* (2013.01); *F16H 59/12* (2013.01); *B60K 2350/2039* (2013.01); *F16H 2059/026* (2013.01); *H01H 2233/002* (2013.01)

(58) Field of Classification Search
CPC ......... B60K 20/08; B60K 37/06; F16H 59/12; F16H 63/42; F16H 2063/423
See application file for complete search history.

(56) References Cited

U.S. PATENT DOCUMENTS

| | | | | |
|---|---|---|---|---|
| 2,610,518 | A * | 9/1952 | Goedeke | F16H 59/12 318/265 |
| 2,848,902 | A * | 8/1958 | Hale | F16H 59/12 74/10.39 |
| 2,933,945 | A * | 4/1960 | Brewster | F16H 59/12 74/10.27 |
| 3,700,080 | A * | 10/1972 | Delorean | B60T 1/005 188/170 |

(Continued)

FOREIGN PATENT DOCUMENTS

WO    2011137267 A1    11/2011

OTHER PUBLICATIONS

"Touch Sensors Design Guide" by ATMEL, 10620 D-AT42-04/09, Revised Apr. 2009, 72 pages, Copyrighted 2008-2009 Atmel Corporation.

(Continued)

*Primary Examiner* — Faye M Fleming
(74) *Attorney, Agent, or Firm* — Vichit Chea; Price Heneveld LLP

(57) ABSTRACT

A pushbutton shifter interface is provided on a vehicle and includes a plurality of pushbutton keys arranged horizontally on a dashboard. The pushbutton shifter interface may be fixedly coupled with the dashboard generally forward of a driver seat. The pushbutton shifter interface is accessible by a driver to select a vehicle operating mode.

18 Claims, 4 Drawing Sheets

(56) References Cited

U.S. PATENT DOCUMENTS

| | | | |
|---|---|---|---|
| 3,780,597 A | 12/1973 | White | |
| 4,884,057 A * | 11/1989 | Leorat | B60K 20/06 |
| | | | 340/456 |
| 6,295,887 B1 * | 10/2001 | DeJonge | B60K 37/06 |
| | | | 477/99 |
| 7,541,553 B2 * | 6/2009 | Meyer | F16H 59/12 |
| | | | 200/310 |
| 8,413,536 B2 | 4/2013 | Giefer et al. | |
| 8,933,708 B2 | 1/2015 | Buttolo et al. | |
| 8,975,903 B2 | 3/2015 | Salter et al. | |
| 9,021,911 B2 * | 5/2015 | Kim | F16H 59/105 |
| | | | 74/473.12 |
| 9,219,472 B2 | 12/2015 | Buttolo et al. | |
| 9,683,655 B2 * | 6/2017 | Ishino | F16H 59/12 |
| 2005/0004724 A1 * | 1/2005 | Fehr | B60K 35/00 |
| | | | 701/29.1 |
| 2007/0018493 A1 * | 1/2007 | Kawachi | B60K 37/06 |
| | | | 297/411.37 |
| 2009/0085368 A1 | 4/2009 | Coffelt et al. | |
| 2011/0219901 A1 | 9/2011 | Giefer et al. | |
| 2012/0133501 A1 | 5/2012 | Walter et al. | |
| 2013/0270896 A1 | 10/2013 | Buttolo et al. | |
| 2013/0270899 A1 | 10/2013 | Buttolo et al. | |
| 2013/0328616 A1 | 12/2013 | Buttolo et al. | |
| 2015/0308566 A1 | 10/2015 | Bialas et al. | |
| 2017/0227118 A1 * | 8/2017 | Buttolo | F16H 59/0217 |
| 2017/0227119 A1 * | 8/2017 | Buttolo | F16H 59/12 |

OTHER PUBLICATIONS

2015 MKZ Interior, www.lincoln.com, 2 pages, Nov. 7, 2016.
2015 Toyota Prius Brochure, 21 pages, 2015.
"Teletouch," https://en.wikipedia.org/wiki/Teletouch, 4 pages, dated Nov. 20, 2015.
Lincoln MKC 2016 brochure, 6 pages, 2016.
2015 Acura TLX SH-AWD Long-Term Road Test, www.edmunds.com, 5 pages, 2015.

* cited by examiner

US 10,336,186 B2

PUSHBUTTON VEHICLE SHIFTER INTERFACE

CROSS-REFERENCE TO RELATED APPLICATION

This application claims benefit to U.S. Provisional Patent Application No. 62/312,135, entitled "PUSHBUTTON VEHICLE SHIFTER INTERFACE," filed on Mar. 23, 2016, the entire disclosure of which is hereby incorporated herein by reference.

FIELD OF THE INVENTION

The present invention generally relates to pushbutton shifter interfaces for vehicles, and more particularly relates to an enhanced pushbutton shifter interface.

BACKGROUND OF THE INVENTION

Automotive vehicles are typically equipped with a gear shifter interface for selecting the various operating modes of a vehicle, including park, reverse, neutral, and drive gear selections. Some automotive vehicles have replaced the conventional gear shifters with shift-by-wire systems that employ user interface inputs such as pushbuttons. It would be desirable to provide for an enhanced operation of a pushbutton shifter interface for use on a vehicle.

SUMMARY OF THE INVENTION

According to one aspect of the present invention, a pushbutton shifter interface is provided. The pushbutton shifter interface includes a support assembly located proximate a panel generally forward of a driver seat and a plurality of pushbutton keys arranged horizontally on the support assembly and actuatable to input a vehicle operating mode.

Embodiments of the first aspect of the invention can include any one or a combination of the following features:
 the plurality of pushbutton keys are arranged side-by-side in a lateral array;
 the pushbutton shifter interface is fixedly coupled with the panel;
 the panel comprises a dashboard panel of the vehicle;
 the plurality of pushbutton keys are located generally forward and below a display device;
 the vehicle pushbutton shifter interface has one or more surface features located between adjacent pushbutton keys;
 the surface features comprise fixed dividers positioned between adjacent keys;
 the vehicle operating modes include vehicle transmission positions;
 the vehicle pushbutton shifter interface has an indicia on a surface of each key and a light source for illuminating the indicia; and
 the vehicle pushbutton shifter interface has a light source and a light pipe for illuminating the keys.

According to another aspect of the present invention, a vehicle includes a panel located generally forward of a driver seat within a passenger compartment of the vehicle, and a support assembly provided in a panel generally forward of the driver seat. The vehicle also includes a plurality of pushbutton keys arranged horizontally on the support assembly and actuatable to input a vehicle operating mode.

Embodiments of the second aspect of the invention can include any one or a combination of the following features:
 the plurality of pushbutton keys are arranged side-by-side in a lateral array;
 the pushbutton shifter interface is fixedly coupled with the panel;
 the panel comprises a dashboard panel of the vehicle;
 the plurality of pushbutton keys are located generally forward and below a display device;
 the vehicle has one or more surface features located between adjacent pushbutton keys;
 the surface features comprise fixed dividers positioned between adjacent keys;
 the vehicle operating modes include vehicle transmission positions;
 the vehicle has an indicia on a surface of each key and a light source for illuminating the indicia; and
 the vehicle has a light source and a light pipe for illuminating the keys.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
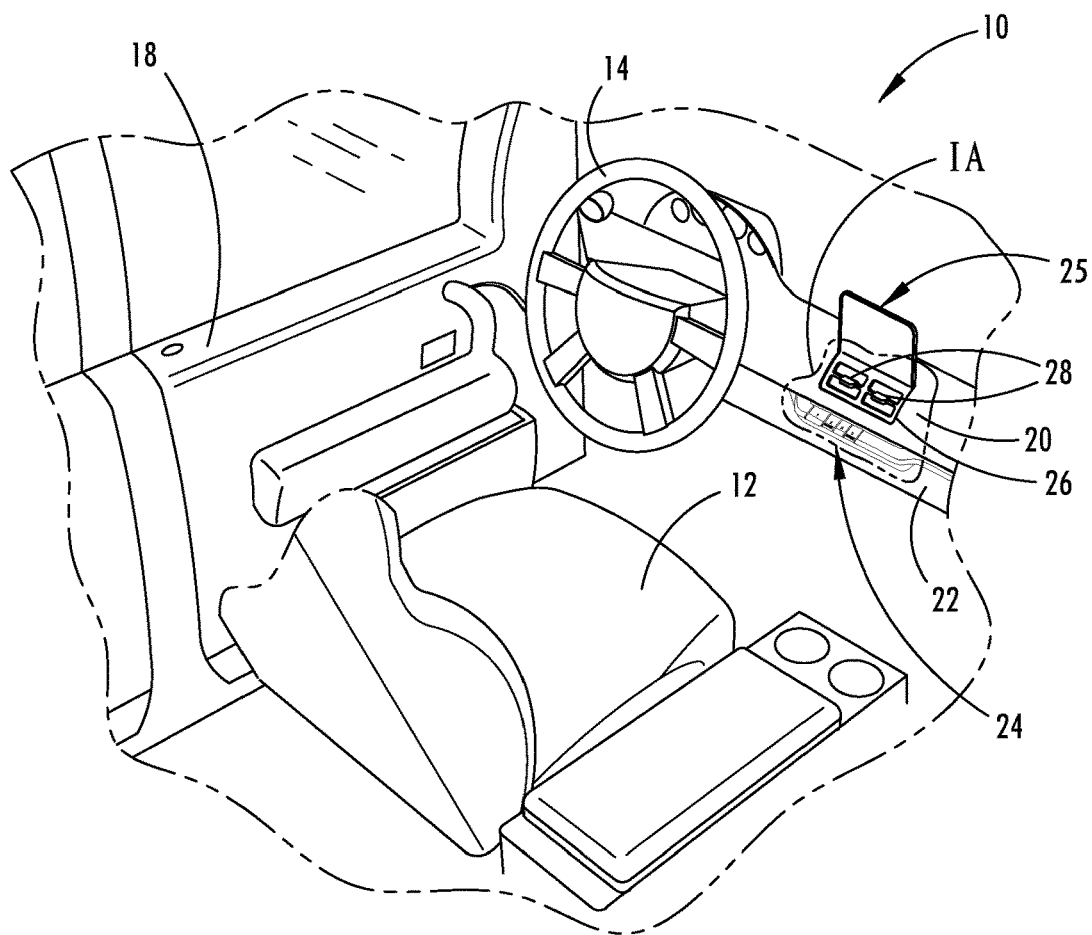
FIG. 1 is a perspective view of a passenger compartment of an automotive vehicle having a pushbutton shifter interface, according to one embodiment.
Figure 1A:
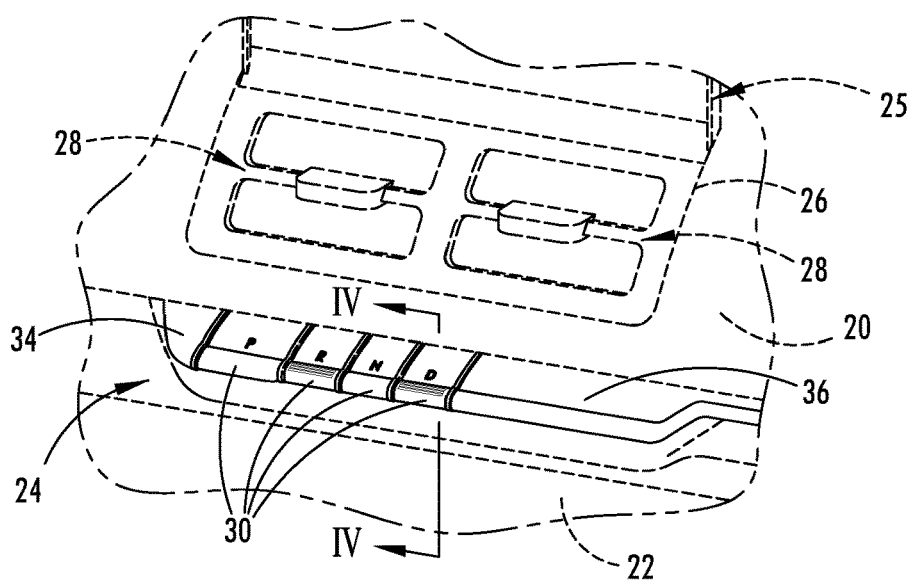
FIG. 1A is an enlarged perspective view of section IA illustrating the pushbutton shifter interface shown in FIG. 1.
Figure 2:
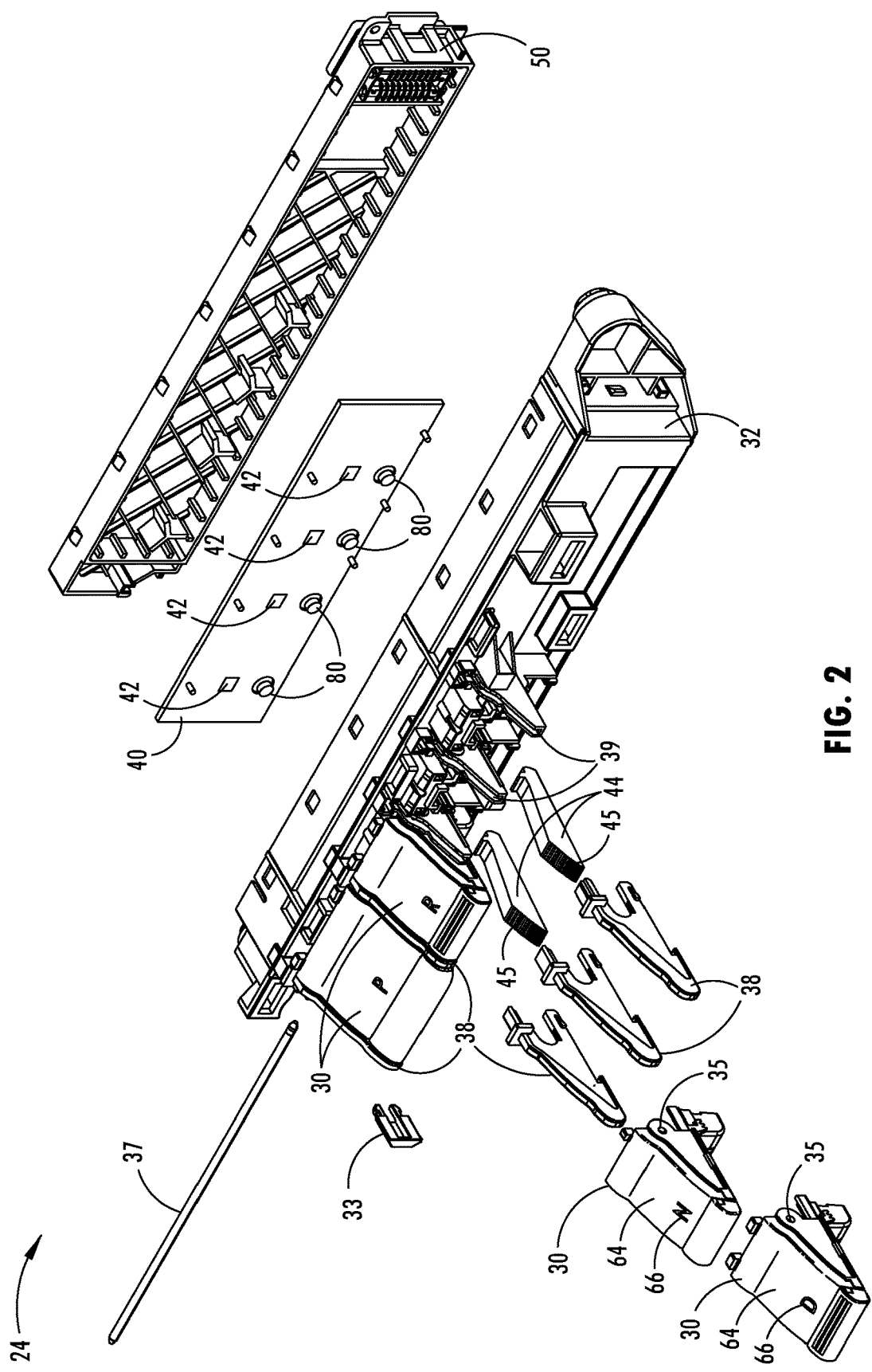
FIG. 2 is an enlarged exploded view of the pushbutton shifter interface shown rearward from the vehicle dashboard.
Figure 3:
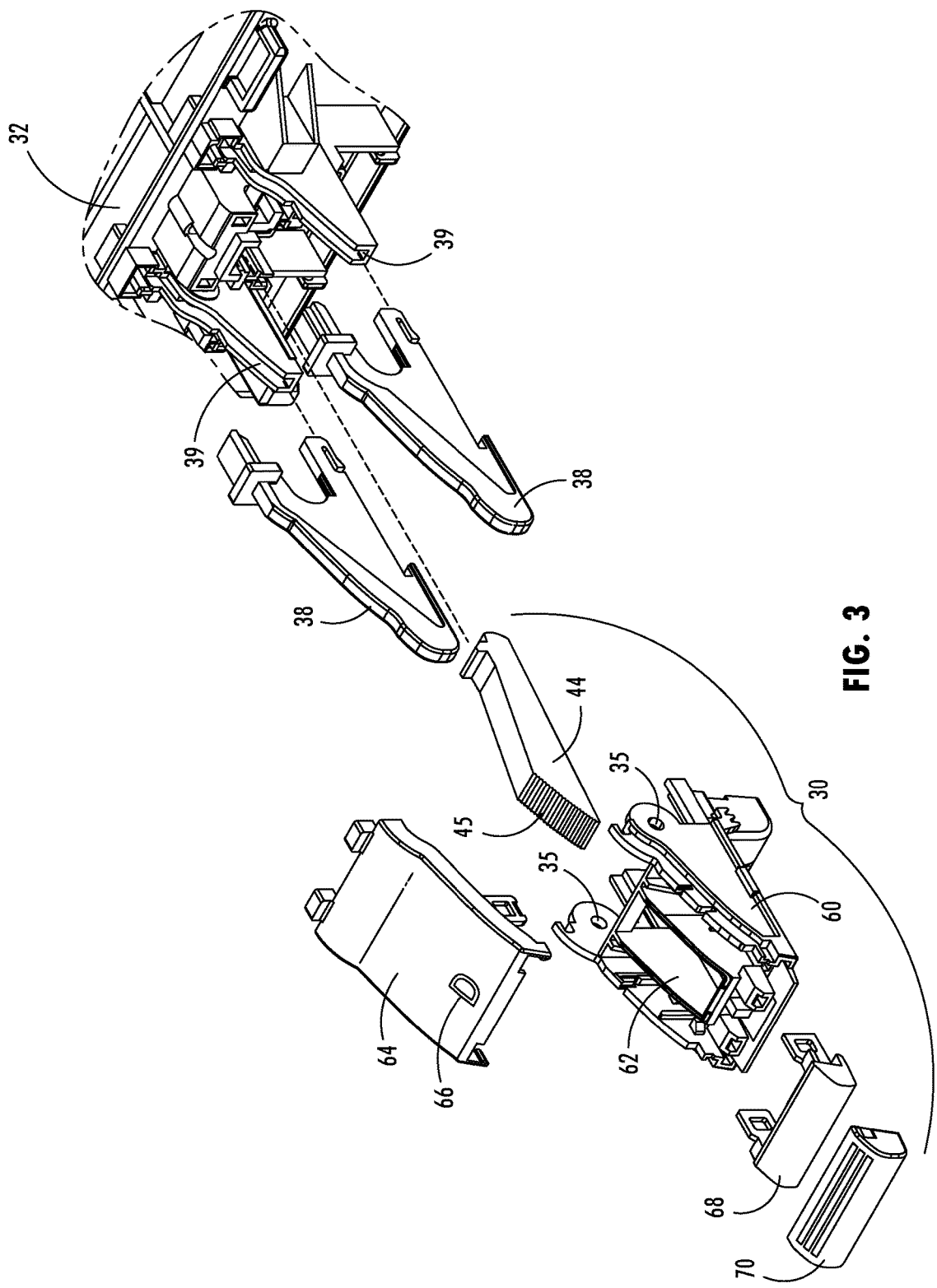
FIG. 3 is an enlarged exploded view of one of the pushbutton keys of the pushbutton shifter interface.

Referring to FIGS. 1 and 1A, the interior passenger compartment of an automotive vehicle 10 is generally illustrated having a pushbutton shifter interface 24, according to one embodiment. The vehicle 10 is shown generally equipped with a driver's seat 12 positioned rearward of a steering wheel 14 and accessible to a driver via a passenger door 18, according to a conventional vehicle seating arrangement. The pushbutton shifter interface 24 is shown located in a forward panel 20, such as an instrument panel or dashboard, and is generally within reach and accessible to the driver of the vehicle seated in the driver seat 12. The pushbutton shifter interface 24 includes a plurality of pushbutton keys 30 that enable the driver to input a vehicle operating mode, such as the transmission gear mode, including park, reverse, neutral, and drive, also referred to as a PRND input. It should be appreciated that more or less pushbutton keys 30 may be employed to input these and other vehicle operating modes such as an input for low transmission gear for a PRNDL input arrangement.

The pushbutton shifter interface 24 is shown arranged horizontally and located in the dashboard panel 20 in the interior passenger compartment of the automotive vehicle 10, according to one embodiment. The pushbutton shifter interface 24 is located generally forward of and below the instrument panel or dashboard panel 20 and generally above a knee bolster trim panel 22. As such, the pushbutton shifter interface 24 is positioned generally forward of the driver's seat 12. The pushbutton shifter interface 24 may be mounted between upper dashboard panel 20 and the lower knee bolster trim panel 22 and extends forward therefrom such that the driver may easily reach and touch the pushbutton shifter interface 24 to actuate a pushbutton key 30 while seated in the driver seat 12. The dashboard panel 20 is also shown having an integrated display and register assembly 25 and air duct registers 28 provided within a common bezel 26. The pushbutton shifter interface 24 is located generally forward and below the integrated display and register assembly 25. As such, a user, such as a driver of the vehicle 10, may easily reach and access the pushbutton shifter interface 24 to input one of the vehicle operating modes including the transmission gear modes PRND.

The pushbutton shifter interface 24 is shown fixedly assembled to the dashboard panel 20 and having a plurality of individually actuatable pushbutton keys 30 that generally extend forward of the dashboard panel 20. Formed on the left side of the pushbutton keys 30 is a first horizontal surface 34 that extends forward from the dashboard panel 20. Formed on right side of the pushbutton keys 30 is a second horizontal surface 36 that extends from the dashboard panel 20. Surfaces 34 and 36 provide a platform that extends on opposite sides of the array of pushbutton keys 30 and upon which a user may rest the hand or one or more finger without activating a pushbutton key 30 with the resting hand or finger.

Figure 4:
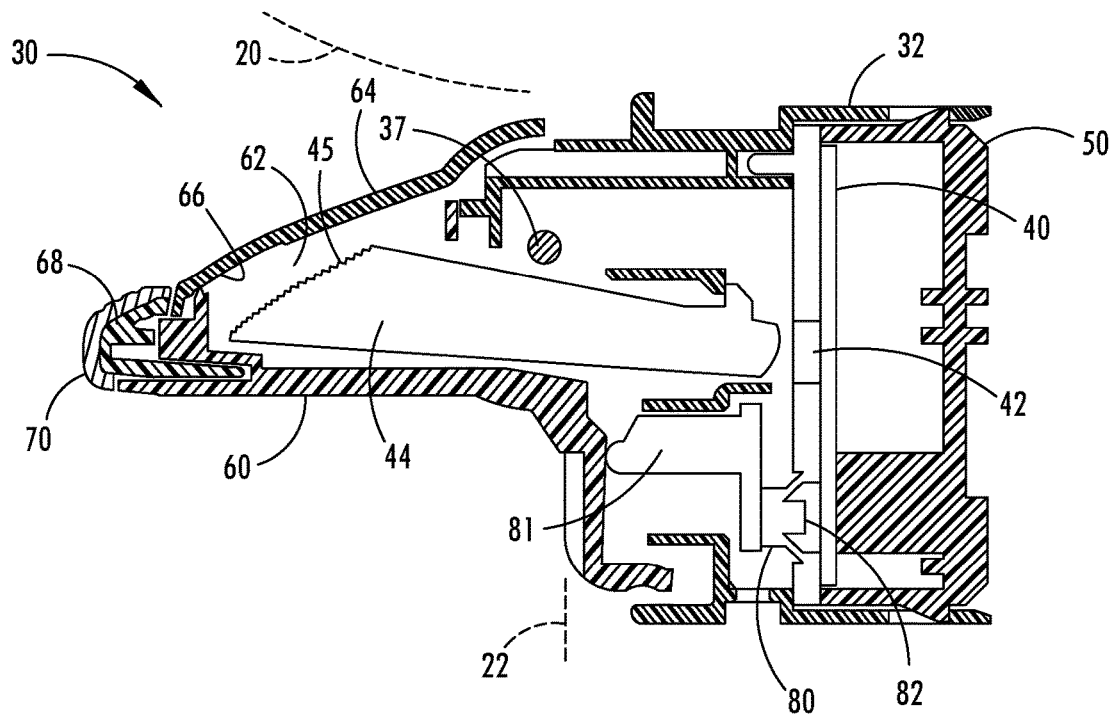
FIG. 4 is a cross-sectional view take through line IV-IV of FIG. 1A illustrating a non-depressed pushbutton key.
Figure 5:
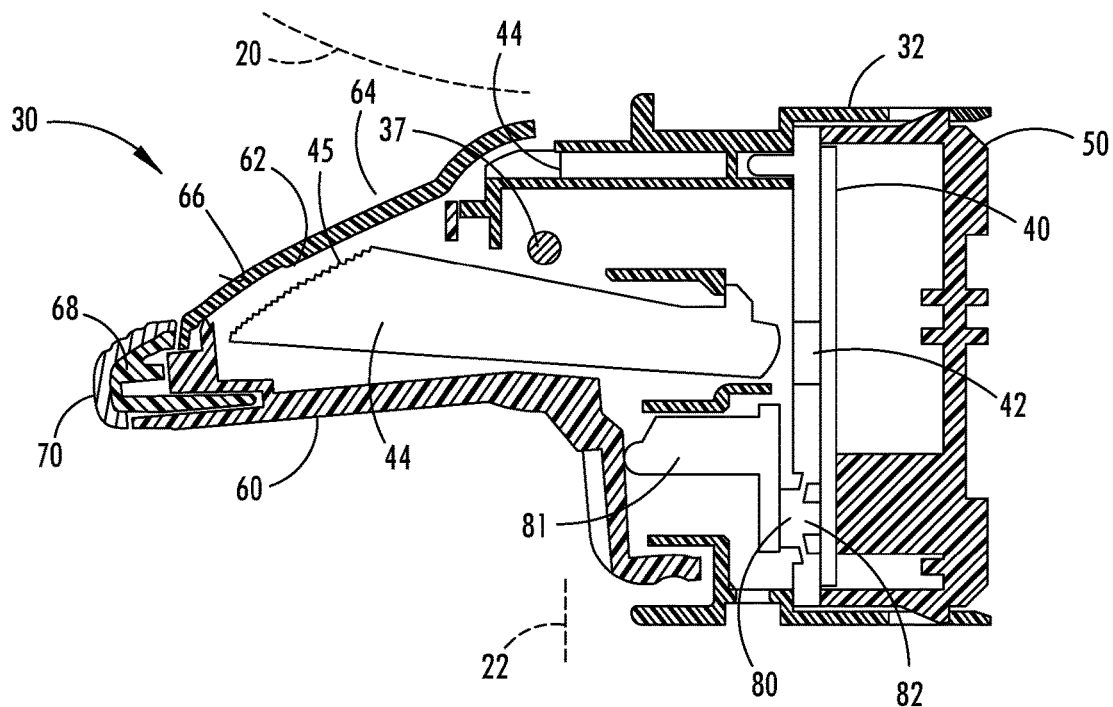
FIG. 5 is a cross-sectional view taken through line IV-IV of FIG. 1A further illustrating a depressed pushbutton key.

The pushbutton shifter interface 24 is illustrated in FIGS. 1-5 having a row of four distinct pushbutton keys 30 arranged horizontally in a side-by-side linear array (1×4) and commonly supported by a pivot rod 37 connected at opposite ends to support housing or assembly 32 on the left and right sides of the row of pushbutton keys 30. Each of the pushbutton keys 30 are connected to the interconnecting pivot rod 37 via round slots 35 formed in the bottom housing 60 of the key and thereupon pivot relative to the interconnecting rod 37 between a downward depressed position (FIG. 5) and an upward non-depressed position (FIG. 4). The pivot rod 37 extends into the support assembly and is locked in place by a locking end cap 33 at one end and a wall at the opposite end. Each pushbutton key 30 has indicia printed or formed on a top surface indicative of a selectable operating mode, such as one of the PRND operating modes. The pushbutton keys 30 are mechanically actuatable downward by force applied by a user, e.g., a driver's finger, and may include a pliable return member that returns the pushbutton key 30 with a bias force to the upward non-depressed position when downward activation force is no longer sufficiently applied. Each pushbutton key 30 is actuatable by pushing downward with sufficient force to a depressed position where a switch is activated to generate a mode selection input signal.

In addition, the individual pushbutton keys 30 are bordered on left and right sides and separated from one another by upward protruding divider members 38 which divide or separate the pushbutton keys 30 and serve to provide a tactile feel at the boundary of each of the pushbutton keys 30. The divider members 38 extend into receiving slots 39 provided in support panel 32 and separate the pushbutton keys 30 on opposite left and right sides of each key 30. The upward protruding divider members 38 may alternatively be in the form of a bump or ridge that allows a user to slide his or her finger across the upper interface surface of the pushbutton keys 30 and feel the change in the surface at the border of each pushbutton key 30 as the finger moves horizontally from one pushbutton key 30 to another pushbutton key 30 along the top surface of the interface 24. It should be appreciated that in lieu of a bump or ridge, each outward protruding member 38 may be otherwise be configured with a different surface contour such as a depression or a change in surface texture, according to other embodiments.

The pushbutton keys 30 are arranged side-by-side in a horizontal and lateral "piano key" style arrangement. Each pushbutton key 30 as shown in FIGS. 1-5 has a horizontally aligned rocker-style button that pivots about the pivot rod 37 near the extremity away from the user. The pivot rod 37 and support assembly 32 provide a support structure that supports the plurality of pushbutton keys 30. According to one embodiment, the rocker-style pushbutton keys 30 each includes a resilient elastomeric dome 80 and a switch 82 mounted thereon. The elastomeric dome 80 may be positioned on a vertical front wall of the support assembly 32 or the LED board 40 behind the pushbutton key 30 and intermediate member 81 and serves to provide bias force to return the pushbutton key 30 to the upward undepressed position. Alternatively, a coil spring or other bias force mechanism could be employed. The elastomeric dome 80 and switch 82 may be located elsewhere on the pushbutton key 30, such as below the key 30. As the user depresses the pushbutton key 30, the pushbutton key 30 pivots about the pivot rod 34 and by pushing on intermediate member 81 activates the switch 82 and depresses the elastomeric dome 80. When the switch 82 is activated, a signal is output indicative of actuation of the pushbutton key 30 which generates a switch input signal for selecting an operating mode. The elastomeric dome 80 is resilient such that the compressed dome 80 forces the pushbutton key 30 to toggle back to its upward non-depressed position upon removal of the user's forceful finger from the pushbutton key 30. It should be appreciated that other configurations of the pushbutton key 30 may be used in connection with the pushbutton shifter interface 24. It should also be appreciated that the pushbutton shifter interface 24 may be used in conjunction with proximity switches and proximity sensors and may be configured as a movable shifter interface, according to other embodiments.

Referring to FIGS. 2-5, the pushbutton shifter interface 24 is shown having the support assembly 32 assembled to a rear support housing 50. Sandwiched between rear support housing 50 and support assembly 32 is a LED and switch lighting board 40 which includes a plurality of light sources 42, such as light emitting diodes (LEDs), assembled on the first side. The light sources 42 provide light illumination to illuminate the pushbutton keys 30 as described herein. Each of the light sources 42 is aligned with a light pipe 44 that extends through the interior region 62 of pushbutton key 30. The light pipe 42 may include a light transmissible medium such as a clear acrylic that transmits light from a light source 42 and redirects and radiates the light illumination onto the contact surface of the pushbutton key 30 where the indicia 66 is located. The light pipe has an input end 43 aligned with the LED 42 and an output end 45 formed with angled surfaces in a saw tooth shape that redirect the light upwards at an angle towards the indicia 66. In addition, the elastomeric dome 80 and switches 82 are also shown assembled on the front side of the LED lighting board 40 and aligned with the corresponding pushbutton keys 30.

Each of the pushbutton keys 30 is shown having a bottom housing 60 and a top housing 64 that assembles onto the bottom housing 62. The bottom housing 62 has lateral upstanding side walls with round shots that engage the pivot rod 37. The top housing 64 has a smoothly contoured surface that includes indicia 66 such as a character (e.g., P, R, N or D) identifying the vehicle operating mode which is positioned above region 62. Light generated by the light source 42 is transmitted via the light pipe 44 in region 62 and redirected towards the touch surface of the key 30 to illuminate the indicia 66. The indicia 66 may be formed by laser etching a pattern in the form of the indicia onto an opaque or otherwise non-light transmittable medium of the upper housing 64. As a result, light is able to illuminate through the laser etched portion 66 to provide light illumination in the shape of the indicia 66.

Each pushbutton key 30 also includes a forward extending member 68 and a frontmost contact surface 70 that snaps onto or otherwise connects to the forward extending member 68. As such, a user may readily ascertain and view the illuminated indicia 66 and may depress the pushbutton key 30 by pressing on the upper surface of the top housing 64 or the front contact surface 70 to pivot the pushbutton key 30 downward about pivot rod 37 to actuate the switch 82 to activate the corresponding vehicle operating mode. Upon release of the pushbutton key 30, the pushbutton key 30 returns to its upright biased position.

The pushbutton shifter interface 24 has enlarged size interface pads for the pushbutton keys 30 that extend forward towards the driver seat 12. The front edge of the pushbutton keys 30 is generally rounded as seen in FIGS. 2-5 to provide a smooth ergonomic look and feel. The top interface surface of the pushbutton keys 30 extends forward of the dashboard panel 20 and may be angled downward to enable a user's finger to interface therewith without interference from any overhanging part of the dashboard panel 20. The dashboard panel 20 is shown partially overhanging the pushbutton keys 30, yet provides enough separation space to enable a driver's finger to interface with the pushbutton keys 30. It should be appreciated that the plurality of pushbutton keys 30 are arranged horizontally, side-by-side, on the support assembly with a downward sloping contact surface. The support member 32 may be screwed or otherwise fastened to a support structure within the dashboard panel 20 and/or knee bolster panel 22 to fix the interface in place.

Accordingly, the pushbutton shifter interface 24 advantageously presents a plurality of pushbutton keys 30 arranged in a horizontal configuration at a location that is convenient for the operator of the vehicle to use and results in non-obstructive shifter interface. The pushbutton shifter interface 24 may be easily operated by the driver of the vehicle to select a vehicle operating mode.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle pushbutton shifter interface comprising:
    a support assembly located proximate a panel in a vehicle generally forward of a driver seat; and
    a plurality of pushbutton keys arranged horizontally on the support assembly and mechanically actuatable downward by force applied by a user to input vehicle operating modes including vehicle transmission positions, wherein the plurality of pushbutton keys pivot about a horizontal pivot rod to actuate a switch.

2. The vehicle pushbutton shifter interface of claim 1, wherein the plurality of pushbutton keys are arranged side-by-side in a lateral array.

3. The vehicle pushbutton shifter interface of claim 1, wherein the pushbutton shifter interface is fixedly coupled with the panel.

4. The vehicle pushbutton shifter interface of claim 3, wherein the panel comprises a dashboard panel of the vehicle.

5. The vehicle pushbutton shifter interface of claim 4, wherein the plurality of pushbutton keys are located generally forward and below a display device.

6. The vehicle pushbutton shifter interface of claim 1 further comprising one or more surface features located between adjacent pushbutton keys.

7. The vehicle pushbutton shifter interface of claim 6, wherein the surface features comprise fixed dividers positioned between adjacent keys.

8. The vehicle pushbutton shifter interface of claim 1 further comprising an indicia on a surface of each key and a light source for illuminating the indicia.

9. The vehicle pushbutton shifter interface of claim 1 further comprising a light source and a light pipe for illuminating the keys.

10. A vehicle comprising:
    a panel located generally forward of a driver seat within a passenger compartment of the vehicle;
    a support assembly provided in a panel generally forward of the driver seat; and
    a plurality of pushbutton keys arranged horizontally on the support assembly and mechanically actuatable downward by force applied by a user to input vehicle operating modes including vehicle transmission positions, wherein the plurality of pushbutton keys pivot about a horizontal pivot rod to actuate a switch.

11. The vehicle pushbutton shifter interface of claim 10, wherein the plurality of pushbutton keys are arranged side-by-side in a lateral array.

12. The vehicle of claim 10, wherein the pushbutton shifter interface is fixedly coupled with the panel.

13. The vehicle of claim 12, wherein the panel comprises a dashboard panel of the vehicle.

14. The vehicle of claim 13, wherein the plurality of pushbutton keys are located generally forward and below a display device.

15. The vehicle of claim 10 further comprising one or more surface features located between adjacent pushbutton keys.

16. The vehicle of claim 15, wherein the surface features comprise fixed dividers positioned between adjacent keys.

17. The vehicle of claim 10 further comprising an indicia on a surface of each key and a light source for illuminating the indicia.

18. The vehicle of claim 10 further comprises a light source and a light pipe for illuminating the keys.

* * * * *